United States Patent
Ishihara et al.

[15] 3,653,826

[45] Apr. 4, 1972

[54] PROCESS FOR THE PRODUCTION OF PHOSPHORIC ACID AT A HIGH CONCENTRATION AND A GYPSUM BY-PRODUCT OF IMPROVED QUALITY

[72] Inventors: Toshio Ishihara; Takayoshi Okazaki; Tetsuzo Endo; Tanizawa Koichi; Sataro Nakajima, all of Tokyo, Japan

[73] Assignee: Nissan Kagaku Kogyo Kabushiki Kaisha, Tokyo, Japan

[22] Filed: Aug. 16, 1968

[21] Appl. No.: 762,210

[30] Foreign Application Priority Data

Sept. 21, 1967 Japan.....................................42/60253
Mar. 11, 1968 Japan.....................................43/15554

[52] U.S. Cl. .................................................23/165, 23/122
[51] Int. Cl. ..........................................................C01b 25/22
[58] Field of Search................................................23/165, 122

[56] References Cited

UNITED STATES PATENTS

| | | | |
|---|---|---|---|
| 3,505,013 | 4/1970 | Araki et al. | 23/122 |
| 3,197,280 | 7/1965 | Boyle et al. | 23/165 |
| 3,453,076 | 7/1969 | Long et al. | 23/165 |
| 3,472,619 | 10/1969 | Chelminski et al. | 23/165 |

FOREIGN PATENTS OR APPLICATIONS

| | | | |
|---|---|---|---|
| 1,094,539 | 12/1967 | Great Britain | 23/165 |
| 6,800,867 | 7/1968 | Netherlands | 23/165 |
| 6,612,150 | 3/1967 | Netherlands | 23/165 |
| 1,162,514 | 8/1969 | England | 23/165 |

*Primary Examiner*—Oscar R. Vertiz
*Assistant Examiner*—Gregory A. Heller
*Attorney*—Holcombe, Wetherill and Brisebois

[57] ABSTRACT

A process for the production of phosphoric acid at a high concentration and a gypsum by-product of improved quality which comprises the steps of mixing phosphate rock with phosphoric acid containing 36 to 44% $P_2O_5$, digesting the mixture with sulphuric acid, precipitating 70 to 80% of the calcium oxide in the phosphate rock as calcium sulphate hemihydrate in a first digester and precipitating all of the calcium oxide in the phosphate rock as calcium sulphate hemihydrate in a second digester, then filtering a slurry of calcium sulphate hemihydrate and washing the cake with a dilute acid, thereby producing phosphoric acid with a $P_2O_5$ concentration greater than 45 percent and phosphoric acid for digestion, and recrystallizing the calcium sulphate hemihydrate into calcium sulphate dihydrate in a mixed acid containing from 10 to 15 percent $P_2O_5$ and from 10 to 15% $H_2SO_4$ at a temperature of 50° to 80° C. and at a solids concentration of 20 to 45 percent, and then filtering and washing it, thereby producing a gypsum by-product containing less than 0.2% $P_2O_5$.

4 Claims, 1 Drawing Figure

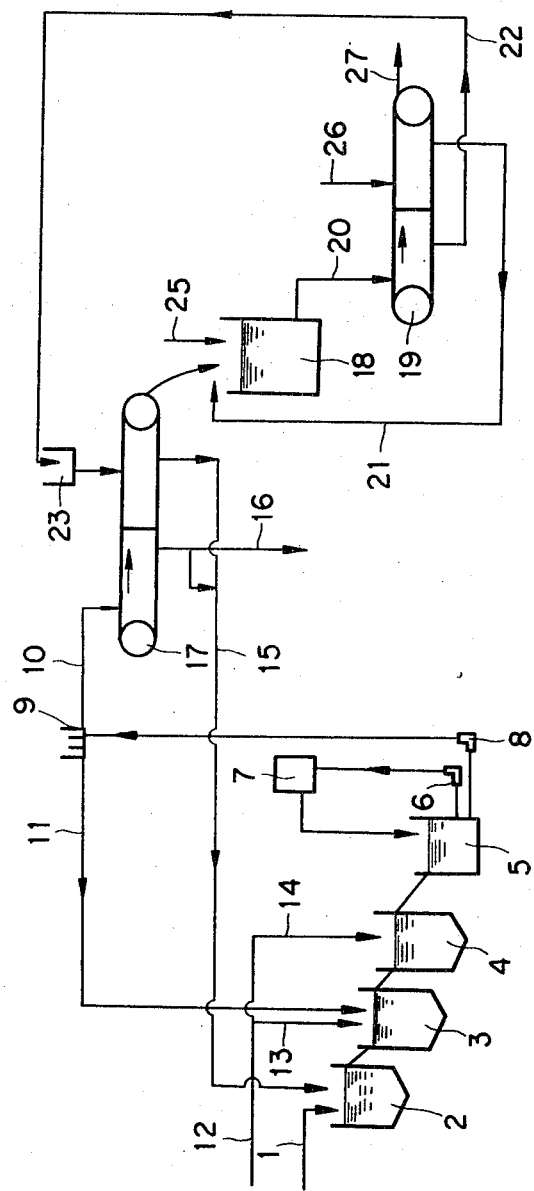

PROCESS FOR THE PRODUCTION OF PHOSPHORIC ACID AT A HIGH CONCENTRATION AND A GYPSUM BY-PRODUCT OF IMPROVED QUALITY

The present invention relates to a process for the production of phosphoric acid at a concentration up to more than 40 percent $P_2O_5$, and a gypsum by-product of improved quality, and more particularly to a process, highly suitable for industrial and economical applications, for producing phosphoric acid at high concentration with high recovery and a gypsum by-product of improved quality, which comprises the steps of digesting phosphate rock with phosphoric acid and sulphuric acid under special conditions, thereby forming a slurry containing stable agglomerates of calcium sulphate hemihydrate crystals, fully washing it in the filtering stage, then repulping the calcium sulphate hemihydrate in a mixed acid of extremely low concentration, re-crystallizing it into calcium sulphate dihydrate, and finally filtering and washing it with water.

In the conventional wet process for producing phosphoric acid, an acid at a low concentration of about 30% $P_2O_5$ is usually produced and this acid is evaporated to a higher concentration for practical application. Numerous attempts have been made to obtain phosphoric acid at a higher concentration directly, without subsequent evaporation, but none of them has proved practically successful.

For instance, S. Nordengren has proposed in his U.S. Pat. No. 1,776,595 a method of producing high-concentration phosphoric acid after separating calcium sulphate in the form of anhydrite or hemihydrate dependent on the relation among acid concentration, temperature and form of calcium sulphate. However, when the concentration of phosphoric acid is high, the digestion of phosphate rock is difficult; moreover, the crystals of calcium sulphate hemihydrate are finer and less easy to separate than those of calcium sulphate dihydrate, and they are unstable, being liable to recrystallize into calcium sulphate dihydrate during the filtration stage. Thus, at present, this method has not been commercially successful.

Studies and inventions have been made in an attempt to eliminate these drawbacks.

For instance, U.S. Pat. No. 2,885,264 discloses a method of adding to the first tank 1.5-3 percent less sulphuric acid than a stoichiometric equivalent to the calcium oxide in phosphate rock, thereby precipitating 85-90 percent of the monocalcium phosphate into calcium sulphate hemihydrate, and precipitating all of the remaining monocalcium phosphate into calcium sulphate hemihydrate in the second tank for the purpose of obtaining easily filterable crystals of calcium sulphate hemihydrate.

Belgian Pat. No. 676,166 proposes a method of producing a slurry containing an easily filterable and washable calcium sulphate hemihydrate which comprises the steps of precipitating 10-60 percent of calcium oxide into calcium sulphate hemihydrate in the first tank with circulation of a large quantity of hot slurry, and in the second tank precipitating all the rest as calcium sulphate hemihydrate. In addition, "I & EC Process Design and Development," Vol. 4, page 85, American Chemical Society, Washington, D. C., 1965, describes a process of spraying sulphuric acid on the foams covering the slurry surface and thereby controlling the decomposition, instead of directly reacting sulphuric acid with the slurry.

Even in these methods, however, the apparatus does not permit the easy circulation of hot slurry in a large quantity, and the resulting calcium sulphate hemihydrate is of low purity. By reason of these drawbacks, these methods have not been found satisfactory for industrial use.

On the other hand, there is method which eliminates the step of filtering and washing calcium sulphate hemihydrate and simply separates crystals from the slurry containing calcium sulphate hemihydrate and without washing, repulps and recrystallizes them in the next stage and thereby produces calcium sulphate anhydrite, as disclosed in U.S. Pat. No. 2,531,977; or produces calcium sulphate dihydrate, as described in "Chemical Engineering Progress," Vol. 62, page 108, American Institute of Chemical Engineers, Philadelphia-New York, 1966. In both methods it is proposed to wash calcium sulphate in the form of stable anhydrite or dihydrate.

Certainly this is one of the effective means to avoid washing the calcium sulphate produced in the form of hemihydrate; but once the calcium sulphate is dehydrated into calcium sulphate anhydrite, it would be unsuitable for use as board or cement. On the contrary, when calcium sulphate hemihydrate is separated without washing, and recrystallized into calcium sulphate dihydrate, the $P_2O_5$ concentration during the recrystallizing stage will necessarily be increased due to the absence of washing. Moreover, if in the digestion stage the phosphoric acid produced is to be obtained at higher concentration, the $P_2O_5$ concentration will be increased by that much and in consequence, said concentration in the recrystallizing stage will in practice become close to the conventional value of about 30 percent. Thus, the hydration of calcium sulphate takes an extremely long time and yet the formed dihydrate will contain relatively great quantities of impurities such as phosphates and fluorine compounds.

In the above-mentioned techniques, usually in order to obtain phosphoric acid at a high concentration, the method of separating calcium sulphate either in the form of hemihydrate or anhydrite is adopted. As the crystals of these compounds are finer than those of calcium sulphate dihydrate, they are very hard to filter and wash. Calcium sulphate hemihydrate is particularly unstable and during filtration and washing it slowly recrystallizes into calcium sulphate dihydrate, tending to cause various difficulties. Accordingly, a high recovery cannot be expected.

When the problem is viewed from the standpoint of the gypsum by-product we see that even in the commercial process utilizing calcium sulphate dihydrate from which the low-concentration phosphoric acid of 30 percent $P_2O_5$ is obtained, small amounts of phosphoric acid and phosphates remain in the gypsum and it is known that the presence of phosphoric acid and phosphate in gypsum is undesirable when that gypsum is to be used in gypsum board or Portland cement. For this reason, the present methods are to rewash the gypsum to reduce the amount of soluble phosphate on the surface of the crystals or, to do what is called, "improvement," i.e., calcine and completely neutralize the water-soluble phosphoric acid in the gypsum before use. In view of this content of phosphoric acid and phosphates, even in the gypsum by-product resulting from the manufacture of low-concentration phosphoric acid, ti is easily inferable that still more impurities will be contained in the gypsum by-product from the manufacture of high-concentration phosphoric acid.

In the sense of effective utilization of phosphate rock, however, the use of the gypsum by-product resulting from the manufacture of phosphoric acid is a problem calling for serious attention. The technique of manufacturing phosphoric acid should be developed by balancing the requirements of these two resulting products.

Specifically, the primary consideration in the manufacture of high-concentration phosphoric acid will be how to easily separate the gypsum by-product from phosphoric acid and the second will be how high to maintain the purity of the gypsum. Moreover, the apparatus must be industrially simple and trouble-free, and, of course, economical with a good liquid balance as a complete system.

In view of this situation, the present inventors have conducted studies on the industrial production of high-concentration phosphoric acid and made the following discovery.

The calcium sulphate hemihydrate formed in a phosphoric acid solution containing a concentration of 45–55% $P_2O_5$ contains considerable quantities of phosphoric acid, although the quantities differ in dependence on the digesting condition. In the first stage of digestion with an excess sulphuric acid, phosphate rock is not digested completely; but when no free sulphuric acid is present, much monocalcium phosphate is formed. Meanwhile it is recognized that, when agglomerate crystals which look easy to filter are formed, these crystals of calcium sulfate hemihydrate contain more phosphoric acid and phosphate than is the case in non-agglomerate crystals. Most of the phosphoric acid contained in these agglomerate crystals of calcium sulphate hemihydrate does not exist on the surface of crystals, but is inside the crystals and does not easily dissolve out with washing. However, the phosphate entrapped within said agglomerate crystals of calcium sulphate hemihydrate is soluble.

It should be noted that this calcium sulphate hemihydrate containing a substantial quantity of soluble phosphates is comparatively stable to water; and its hydration in the stage of filtering and washing in much slower than that of calcium sulphate hemihydrate containing a smaller quantity of soluble phosphates. The crystalline structure of calcium sulphate and other factors may be involved in this phenomenon, but it is easily predictable from common observation that hydration is retarded in phosphoric acid solutions. It has also been found that the quantity of phosphoric acid or phosphates can be controlled in dependence on the digesting condition of phosphate rock.

In general, if the aim is to obtain a gypsum by-product of improved quality as well as phosphoric acid at a high concentration with high recovery, washing while in the form of calcium sulphate hemihydrate should, if possible, be avoided, with only a portion of the phosphoric acid solution being separated, and hydration should desirably take place in the next stage when there is a lowered concentration of phosphoric acid, and full washing should be carried out when the material is in the form of calcium sulphate dihydrate. In this case, however, since all the filtrate in the system after filtration of recrystalized calcium sulphate dihydrate should be used up, it is impossible for reasons of liquid balance to determine the concentration of phosphoric acid for recrystallization arbitrarily. When the concentration of the phosphoric acid produced is to range between 45 and 50 percent, the concentration of phosphoric acid in the solution to be recrystallized will be 27–30 percent. This is equivalent to the $P_2O_5$ concentration of the conventional dihydrate process, in which recrystallization will take a very long time and it will be impossible to eliminate the impurities in the gypsum, i.e., phosphates and fluorine compounds, any better than by the conventional dihydrate process.

The present invention is free from these drawbacks. After various studies, the present inventors have developed the present invention, based on the following process: First, the phosphate rock is mixed in pre-mixer with a solution containing 36–44% $P_2O_5$ to be provided from a later step, and formed into a slurry. Next, in the first digester, sulphuric acid is added, precipitating 70–80 percent of calcium oxide in the rock into calcium sulphate hemihydrate and 20–30 percent of it into monocalcium phosphate. Then, in the second digester, the monocalcium phosphate is precipitated as calcium sulphate hemihydrate while constantly maintaining the concentration of free sulphuric acid at 2–3 percent. Then, a portion of said slurry is recirculated for use in the pre-mixer or in the first digester, the rest of said slurry being filtered, and phosphoric acid separated therefrom. The cake of calcium sulphate hemihydrate is washed with the filtrate of calcium sulphate dihydrate to be provided from a later step, said filtrate being re-used for the digestion of phosphate rock. The cake is repulped to a 20–45 percent solids concentration, at a temperature of 50°–80° C. in a dilute acid containing 10–15% $P_2O_5$ and 10–15 percent sulphuric acid, and shortly recrystallized into calcium sulphate dihydrate. It is then filtered and washed to separate the calcium sulphate dihydrate and thereafter, the filtrate is utilized as a washing solution for calcium sulphate hemihydrate, while the washing filtrate is recirculated for use in the repulping of calcium sulphate hemihydrate. Thus, a high-concentration phosphoric acid can be produced with an improved quality of gypsum as a by-product.

In this specification, the term "high-concentration phosphoric acid" is defined as a phosphoric acid having a $P_2O_5$ concentration as high as approximately 40–55 percent and a free sulphuric acid concentration as high as 2–3 percent.

The method of this invention is advantageous for producing a high-concentration phosphoric acid having a 45–55% $P_2O_5$ concentration, but if the liquid balance is properly taken into account, the method may also be used to produce a phosphoric acid having a concentration of about 40% $P_2O_5$.

In the definition of this invention, the term "gypsum by-product of improved quality" means a gypsum in which the total $P_2O_5$ contained in the calcium sulphate dihydrate is less than 0.2 percent, with extremely small amounts of such impurities as fluorine compounds, and in the form of desirable crystals regardless of the source of phosphate rock.

The important point in the method of this invention, which involves the washing of calcium sulphate hemihydrate, is how to obtain calcium sulphate hemihydrate which contains no non-digested phosphate rock but does contain a certain amount of soluble phosphoric acid and phosphate. This constitutes a vital element of invention, in combination with the proportions of split additions of sulphuric acid in the digestion process. Stable, agglomerate calcium sulphate hemihydrate can be formed by firstly precipitating 70–80 percent of the calcium oxide in phosphate rock as calcium sulphate hemihydrate and 20–30 percent of it as monocalcium phosphate by digesting the phosphate rock with sulphuric acid and phosphoric acid, and then precipitating the monocalcium phosphate into calcium sulphate hemihydrate while 2–3 percent free sulphuric acid is constantly retained.

The calcium sulphate hemihydrate formed in this manner is very stable to washing. It is desirable to use a sulphuric acid of about 95–98.5 percent concentration in this process.

In the first stage of acid digestion, if less than 70 percent of the calcium oxide in the rock is precipitated as calcium sulphate hemihydrate and more than 30 percent of it as monocalcium phosphate, the formed agglomerate crystals will be adapted to be filtered out, but the digestion of phosphate rock is not complete, which results in poor yields.

If, by contrast, more than 80 percent of the calcium oxide is precipitated as calcium sulphate hemihydrate and less than 20 percent of it as monocalcium phosphate, the digestion ratio of the rock may be improved, but the agglomerate crystals become rather small, which makes them more difficult to filter them out. From the standpoint of thermal balance, too, the split ratio of sulphuric acid introduction in this invention is found very easy to control.

Next, in the second stage of acid digestion, in which sulphuric acid is added to convert the monocalcium phosphate to calcium sulphate hemihydrate and phosphoric acid, filtration will be difficult if there is less than 2 percent free sulphuric acid. But, if there is more than 3 percent, the process will not be economical.

The preferred reaction temperature range of this process is 70°–80° C. in the pre-mixer and 90°–100° C. in first and second digesters. The slurry containing the calcium sulphate hemihydrate formed should desirably be cooled to about 70° C. in the receiver tank and filtered at this temperature.

The preferred reaction period is 5–10 minutes in the pre-mixer, and about 1–2.5 hours in the first and second digesters, under agitation.

The preferred proportion between the amount of calcium sulphate hemihydrate slurry to be returned from the slurry distributor to recirculate to the pre-mixer or to the first digester and the amount of slurry to be filtered by the calcium sulphate hemihydrate filter is between 1/1 and 2/1 from the standpoint of thermal balance. The temperature should be about 70° C.

The liquid for hydrating the calcium sulphate hemihydrate obtained from the digestion stage should contain 10–15% $P_2O_5$ and 10–15 percent sulphuric acid, the temperature being 50°–80° C. and preferably 60°–70° C. and the solids concentration should lie between 20–45 percent and preferably 30–40 percent. Under these conditions hydration is completed in about 120 minutes. Moreover, calcium sulphate dihydrate in excellent crystal form containing less than 0.2Y% $P_2O_5$ can be produced. From a mixed solution of phosphoric acid and sulphuric acid with a concentration of 10–15% $P_2O_5$ and 10–15 percent sulphuric acid, good crystals of gypsum can be produced in a short time if the temperature, solids concentration, and other factors match. When the $P_2O_5$ concentration in this mixed acid is below 10 percent, calcium sulphate dihydrate will precipitate very rapidly, and is completed in less than 30 minutes, but the crystals become rather needle-shaped, which is undesirable. If the $P_2O_5$ concentration is more than 15 percent, hydration is slow, greatly increasing the proportion of phosphoric acid and phosphates in the calcium sulphate dihydrate, which is undesirable. Meanwhile, if the sulphuric acid concentration in this mixed acid is less than 10 percent hydration will be slow and the proportion of phosphoric acid and phosphates in the gypsum will be increased. By contrast, when the sulphuric acid concentration is over 15 percent, the temperature for hydration will be difficult to control, and involves the possibility of dehydration to calcium sulphate anhydrite.

When the sulphuric acid concentration in the hydration liquid, i.e., the washing filtrate from the calcium sulphate dihydrate filter, is low when repulping the calcium sulphate hemihydrate, more sulphuric acid is added to make the concentration equal to 10–15 percent. The hydration temperature should be maintained at 50°–80° C. If the temperature drops below 50° C., hydration may be completed within the specified time of 120 minutes in this invention, but the proportion of phosphoric acid and phosphates in the formed gypsum will be greatly increased. By contrast, at over 80° C., hydration will be incomplete.

The present inventors have discovered that the solids concentration during hydration has great influence on the phosphoric acid and phosphates contents of gypsum. Specifically, to obtain good gypsum according to this invention, the solids concentration should be 20–45 percent. If hydration is carried out at less than 20 percent solids concentration, the crystalline form of the gypsum and the hydration time may be satisfactory, but the $P_2O_5$ content of the gypsum will be increased, producing gypsum of less desirable quality than expected. This is presumably because hydration is materially affected by the solids concentration. As this concentration decreases, the hydration speed increases, which affects the entrapment of phosphoric acid into the gypsum. On the contrary, a solids concentration exceeding 45 percent will make agitation practically impossible.

The high stability to washing of the calcium sulphate hemihydrate obtained through acid digestion according to the method of this invention will be apparent from following test example.

Test

Thirty grams of calcium sulphate hemihydrates obtained by three different processes was suspended in 100 g. of water, stirred at 50° C., and at definite intervals of time the quantity of water of crystallization was measured. The results are given in Table 1.

TABLE 1

| Kinds of calcium sulphate hemihydrate | $P_2O_5$ content (%) | Water of crystallization (%) | | | |
|---|---|---|---|---|---|
| | | after 30 min. | after 1 hr. | after 5 hrs. | after 24 hrs. |
| Present invention | 1.03 | 6.3 | 6.4 | 6.7 | 6.9 |
| Hemihydrate from conventional hemidihydrate process | 0.95 | 6.2 | 7.3 | 9.1 | 12.4 |
| Calcined hemihydrate from dihydrate process | 0.2 | 19.5 | 20.1 | 20.5 | 20.5 |

As shown by this example, the calcium sulphate hemihydrate formed according to the method of this invention is stable to water and is fully washable in the stage of filtering and washing, and accordingly the succeeding stages of repulping and recrystallization can be carried out with an extremely low concentration of phosphoric acid. Recrystallization can be completed in a very short time. Further, with all the above-mentioned factors matched, calcium sulphate dihydrate of improved quality with extremely small quantities of phosphoric acid, phosphates and impurities such as fluorine compounds can be produced.

The calcium sulphate hemihydrate slurry obtained by digestion is filtered, separating the phosphoric acid product containing 45–55% $P_2O_5$. Moreover, on account of the above-mentioned effect of the proportions into which the sulphuric acid added at various times in the digestion stage is split, this calcium sulphate hemihydrate is washable. Therefore it is washed with the filtrate from the calcium sulphate dihydrate filtration obtained in a subsequent stage and then sent to the recrystallizer for repulping. As a result the $P_2O_5$ concentration in the solution in the recrystallizer can be limited to 10–15 percent against 30 percent in a process comprising no washing step. Thus, by adding sulphuric acid to the solution and conducting the hydration at a 10–15 percent $H_2SO_4$ concentration, it becomes possible to produce calcium sulphate dihydrate having well shaped crystals with a total $P_2O_5$ content less than 0.2 percent and an extremely small amount of impurities such as fluorine compounds, regardless of the source of phosphate rock.

Details of the method of this invention will now be described with reference to the attached drawing, which is a flow sheet explaining said method.

As shown in this drawing, the ground phosphate rock is weighed and charged into a pre-mixer 2 via a pipe 1. Phosphoric acid is added to the pre-mixer 2 through a pipe 15 for digestion. The acid contains 36–44 percent $P_2O_5$ and is prepared from the filtrate from the second section of a filter 17 and from phosphoric acid produced by the process. The ground rock is thoroughly mixed and distributed. The temperature is thereby held at 70°–80° C. and the retention time is 5–10 minutes. Then the slurry, which has been partially turned into monocalcium phosphate, overflows into the first digester 3, to which at the same time 98 percent sulphuric acid is supplied through a pipe 13 branching off a pipe 12. Meanwhile, the slurry circulated from a receiver tank 5 is delivered by a pump 8 to a slurry distributor 9 where said slurry is divided and a portion supplied to the digester 3 through a pipe 11. The quantity of sulphuric acid added, together with the amount contained in the circulated slurry to be added to the first digester 3, should be sufficient to precipitate 70°–80 percent of the calcium oxide in the rock as calcium sulphate hemihydrate, the temperature being 90°–100° C. and the retention time about 1–2.5 hours. (The circulated slurry from the receiver tank 5 may instead be added to the pre-mixer 2.) Then the slurry overflows into the second digester 4. Sulfuric acid is added to the digester 4 through a pipe 14 branching off the pipe 12, thereby maintaining the concentration of free sulphuric acid constant at 2–3 percent. In this digester all the monocalcium phosphate in the slurry is precipitated as calcium sulphate hemihydrate, the temperature in said second digester being 90°–100° C., as in the first digester 3.

The slurry in the digester 4 goes to the receiver tank 5, from which it is delivered by a pump 6 to a cooler 7, where it is cooled to about 70° C. The cooling method is not critical. Any routine method will suffice, but air cooling is desirable. The cooled slurry is delivered by the pump 8 to the slurry distributor 9, where it is divided, one portion passing through a pipe 10 to the filter 17 for calcium sulphate hemihydrate and the other portion circulating through the pipe 11 to the first digester 3 or to the pre-mixer 2.

The amount circulated is preferably 1 to 2 times the amount of slurry supplied to the filter 17. This serves for temperature control and acts as seed.

The phosphoric acid filtered by the filter 17 has a 45–50% $P_2O_5$ concentration and a 2–3% $H_2SO_4$ concentration. Part of it is employed for controlling the concentration of the acid for digestion and the rest passes trough a pipe 16 to the storage tank. Meanwhile, the cake of calcium sulphate hemihydrate from which the phosphoric acid has been separated is washed in the second section of the calcium sulphate hemihydrate filter 17 with the filtrate from the first section of the calcium sulphate dihydrate filter 19, said filtrate being supplied via a pipe 22. As described above, this washing filtrate passes through the pipe 15 and, after adjustment with phosphoric acid, is sent to the pre-mixer 2, there to be used.

The cake thus washed is moved to a recrystallizer 18, where it is repulped by the washing filtrate supplied through the pipe 21 from the second section of the filter 19 for calcium sulphate dihydrate and the solution is kept at a 10–15% $P_2O_5$ concentration, and 10–15% $H_2SO_4$ concentration by adding sulphuric acid supplied through the pipe 25. Then, as the result of recrystallization taking place at the temperature of 50°–80 C. for 120 minutes in the recrystallizer 18, all the calcium sulphate hemihydrate recrystallizes to calcium sulphate dihydrate. At the same time the various impurities contained in the calcium sulphate hemihydrate such as $P_2O_5$, F, etc. are dissolved away and the content of $P_2O_5$, fluorine and other impurities in the gypsum by-product is thereby minimized.

The slurry formed at this point travels through a pipe 20 to the first section of the filter 19, where it is filtered. The gypsum by-product is further washed in the second filter section with water or hot water supplied through a pipe 26, the calcium sulphate dihydrate by-product being obtained at 27. As mentioned earlier, the filtrate in the first section is supplied through the pipe 22 as the washing fluid for the calcium sulphate hemihydrate.

In this case, in order to more perfectly prevent conversion of calcium sulphate hemihydrate into calcium sulphate dihydrate in the filter due to washing, it is possible to neutralize the sulphuric acid in the solution with lime or ground phosphate rock in the neutralizing tank 23. It goes without saying that neutralization will not always be necessary for calcium sulphate hemihydrate obtained through digestion in this invention under conditions fully meeting the requirements of this invention.

The phosphoric acid produced by the method of this invention has a concentration of $P_2O_5$ as high as 40–55 percent with a high recovery of over 98% $P_2O_5$.

The calcium sulphate hemihydrate formed by this invention is so stable to water that it can be fully washed in the stage of filtering and washing. Accordingly the subsequent repulping process can be conducted at a very low concentration of phosphoric acid and in consequence, the time required for recrystallization can be very short. The $P_2O_5$ content in the gypsum is less than 0.2 percent and the product can be utilized for gypsum board and Portland cement.

Next, several specific examples of this invention will be described:

EXAMPLE 1

A pre-mixer having an effective volume of 7.5 liters and two 50 liter digesters were used. Florida phosphate rock containing 33.3% $P_2O_5$ and 47.4% CaO, and a phosphoric acid solution containing 36.1% $P_2O_5$ and 4.2% $H_2SO_4$ were fed at the rates of 18 kg./hr. and 43.3kg./hr. respectively into the pre-mixer and mixed together at 75° C. They were then permitted to overflow into the first digester, to which additions of 70° C. circulated slurry at a rate of 104 kg./hr. and 98.5 percent sulphuric acid at a rate of 6.84 kg./hr. were made. Digestion continued for 1.2 hours at 95° C. The feed rate of sulphuric acid required for precipitating all the CaO in the rock as calcium sulphate hemihydrate was 14.9 kg./hr. The feed rate of sulphuric acid to the first digester was 1,82 kg./hr. from the pre-mixer and 1.78 kg./hr. in the circulated slurry, while the fresh addition of sulphuric acid was 6.73 kg./hr. (98.5 × 6.84 kg./hr.), totaling 10.33 kg./hr. Thus, the total amount of sulphuric acid in the first digester corresponded to just 70 percent of the stoichiometrically equivalent amount required for digestion.

The slurry overflowing out of the first digester passed to the second digester, where with further addition of 98.5 percent sulphuric acid at a rate of 7.18 kg./hr., reaction took place at 95° C. for 1.2 hours. This amount of sulphuric acid was in excess of the amount required for precipitating all the CaO in the rock as calcium sulphate hemihydrate and in consequence the concentration of sulphuric acid in the second digester could be maintained at around 2.5 percent.

The slurry digested in the second digester was cooled to 70° C., , filtered at a rate of 69.2 Kg./hr., and washed with 24.8 kg./hr. of a solution containing 14.5% $P_2O_5$ and 10% $H_2SO_4$, thereby producing 24.3 kg./hr. of phosphoric acid containing 45% $P_2O_5$ and 2.5% $H_2SO_4$, 32 kg./hr. of washing filtrate containing 33.2% $P_2O_5$ and 37.7 kg./hr. of calcium sulphate hemihydrate cake. Using said washing filtrate and a portion o the phosphoric acid produced, the acid for mixing with the phosphate rock was prepared, and recirculated for use.

The cake was put into the recrystallizer, repulped with 25.1 kg./hr. of the washing filtrate of calcium sulphate dihydrate filter from the next stage, 1.12 kg./hr. of 98.5 percent sulphuric acid was then added so as to make a suspension with a 40 percent solids concentration, 14.5% $P_2O_5$ concentration, and 10% $H_2SO_4$ concentration, and stirred at 70° C. for 2 hours. The resulting slurry was filtered at a rate of 64.5 kg./hr., washed with 19.3 kg./hr. of water, and dried, producing 25.8 kg./hr. of dried calcium sulphate dihydrate, analysis of which indicated 0.18 percent total $P_2O_5$ and 0.04 percent water soluble $P_2O_5$.

Calculated therefrom, the recovery of $P_2O_5$ was 99.3 percent. The filtrate from the calcium sulphate dihydrate filtration was utilized for washing the calcium sulphate hemihydrate and the washing filtrate was piped to the recrystallizer, to be utilized for repulping.

EXAMPLE 2

Using the same apparatus as in Example 1, 18 kg./hr. of Kola ground phosphate rock (90percent passing 100-mesh and 70percent passing 200-mesh) containing 35.36 percent $P_2O_5$ and 50.3% CaO, and 49.7 kg./hr. of phosphoric acid solution containing 43.8% $P_2O_5$ and 3.16% $H_2SO_4$ were fed into the pre-mixer, mixed at 75° C.; and overflowed into the first digester, in which digestion continued for 1.2 hours at 93° C. with 77 kg./hr. of 70° circulated slurry and 9.95 kg./hr. of 98% $H_2SO_4$ being added. The quantities of sulphuric acid added to this digester corresponded to 80 percent of the stoichiometric equivalent for precipitating all CaO in the rock as calcium sulphate hemihydrate.

The slurry overflowing out of the first digester went to the second digester, where an additional 6.85 kg./hr. of 98% $H_2SO_4$ was added and the reaction carried out at 93° C. for 1.2 hrs. The total quantities of $H_2SO_4$ were in excess of the stoichiometrically equivalent amount, the concentration of sulphuric acid in the solution of the second digester being constantly maintained at about 2.5 percent.

The digested slurry was then cooled to 70° C., filtered at a rate of 77 kg./hr., and immediately thereafter washed with 22.8 kg./hr. of a solution containing 12% $P_2O_5$ and 10% $H_2SO_4$, thereby producing 28.9 kg./hr. of phosphoric acid containing 52 percent $P_2O_5$ and 2.5% $H_2SO_4$, 32.3 kg./hr. of washing filtrate and 36.5 kg./hr. of cake. Using approximately the same process as described above, a phosphoric acid solution containing 54% $P_2O_5$ concentration was obtained.

EXAMPLE 3

In a process similar to that of Example 1, calcium sulphate hemihydrate for testing was prepared.

Said calcium sulphate hemihydrate (6.6 percent water of crystallization, 0.99 percent total $P_2O_5$ and 0.16 percent water-soluble $P_2O_5$) in the amount of 14.9 kg. was added to 16 θkg. of mixed acid containing 11.19% $P_2O_5$ and 11% $H_2SO_4$ heated to 70° C., and maintained at this temperature while being stirred. The reaction was completed after 120 minutes, producing calcium sulphate dihydrate, which was filtered, washed and dried into 12.5 kg. of calcium sulphate dihydrate. The reaction system after 120 minutes had a 40.7 percent solids concentration and the composition of the mixed acid included 10.5% $P_2O_5$ and 9.37% $H_2SO_4$.

The analysis of the calcium sulphate dihydrate produced was as follows:

| | |
|---|---|
| Water of crystallization | 19.1% |
| CaO | 31 % |
| $SO_3$ | 44.3% |
| Total $P_2O_5$ | 0.15% |
| Water-soluble $P_2O_5$ | 0.03% |

EXAMPLE 4

Calcium sulphate hemihydrate for testing was prepared in the same manner as in Example 1. Said calcium sulphate hemihydrate (7.9 percent water of crystallization, 1.02 percent total $P_2O_5$, and 0.25 percent water-soluble $P_2O_5$) in the amount of 12.3 kg. was added to 24.1 kg. of mixed acid containing 10.8% $P_2O_5$ and 15% $H_2SO_4$ which had been heated to 50° C., and stirred with said temperature maintained. 60 minutes later, the reaction was stopped, yielding a slurry of calcium sulphate dihydrate, which was filtered, washed and dried into 10.65 kg. of calcium sulphate dihydrate.

The reaction system after 60 minutes had a 29.4 percent solids concentration and the composition of mixed acid contained 10.6% $P_2O_5$ and 14.7% $H_2SO_4$. The analysis of the product was as follows:

| | |
|---|---|
| Water of crystallization | 19.5% |
| CaO | 31.6% |
| $SO_3$ | 45.3% |
| Total $P_2O_5$ | 0.18% |
| Water soluble $P_2O_5$ | 0.04% |

Example 5

In the same manner as in Example 1, sulphuric acid was added to the first and second digesters, with only the rate of addition being changed.

With a view to determining the precipitation of calcium sulphate hemihydrate with additions of 95, 70 and 50 percent, respectively, of the necessary quantity of sulphuric acid for digestion in the first digester, the quantities of $P_2O_5$ (except the $P_2O_5$ on the surface of crystals) were investigated for the non-digested portion and for entrapped portion. The results were compared with the sizes of agglomerate crystals as follows:

| $H_2SO_4$ added to the first digester $H_2SO_4$ required (%) for digestion | Non-digested $P_2O_5$ (%) | $P_2O_5$ in crystals (%) | Size of agglomerate crystal μ |
|---|---|---|---|
| 95 | 0.06 | 1.53 | 7–15 |
| 70 | 0.19 | 1.08 | 10–20 |
| 50 | 0.25 | 0.77 | 10–30 |

From these results it was concluded that the filterability of calcium sulphate hemihydrate is best when a 50 percent precipitation of calcium sulphate occurs in the first digester, and the digestion ratio or stability of calcium sulphate hemihydrate to washing is best with 95 percent precipitation.

In the present invention, 70 percent precipitation has been adopted to secure the most advantageous combination of both stability and filterability.

What is claimed is:

1. In a process for producing phosphoric acid and gypsum containing less than 0.2% $P_2O_5$ by digesting phosphate rock with sulphuric acid and phosphoric acid to produce a high concentration of phosphoric acid and calcium sulphate hemihydrate, filtering the resulting mixture to separate the phosphoric acid, washing, repulping and recrystallizing said calcium sulphate hemihydrate to produce calcium sulphate dihydrate, and filtering and washing the resulting calcium sulphate dihydrate to obtain by-product gypsum the improvement comprising step one pre-mixing phosphate rock with phosphoric acid derived from the subsequent steps four and five which has a $P_2O_5$ content adjusted to 36–44 percent by weight, at 70°–80° C. to form a slurry, step two in a first digester adding sulphuric acid to the slurry to digest all of said phosphate rock by precipitating from 70 to 80 percent by weight of the calcium oxide in the phosphate rock in the form of calcium sulphate hemihydrate and to dissolve the rest of the calcium oxide in the phosphate rock by forming monocalcium phosphate, at 90°–100° C., step three in a second digester precipitating the monocalcium phosphate as calcium sulphate hemihydrate by adding sufficient sulphuric acid to maintain the content of free sulphuric acid in the liquid phase of the slurry constant at 2 to 3 percent by weight, at 90°–100° C., step four circulating a part of the resulting slurry to said step one before filtering while the ratio of dividing of slurry to be filtered is 2–1:1, filtering the remainder of the slurry thereby separating the product phosphoric acid which has a 40–55% $P_2O_5$ content therefrom and recycling a part of the product phosphoric acid to said step one with the washings of calcium sulphate hemihydrate, step five washing the solid residue of calcium sulphate hemihydrate with the filtrate from step seven and circulating the washings to said step one, step six repulping and recrystallizing said washed calcium sulphate hemihydrate into calcium sulphate dihydrate in a mixture of phosphoric acid and sulphuric acid which contains more phosphoric acid than sulphuric acid obtained by adding sulphuric acid to the washings of step eight, and of which the phosphoric acid and sulphuric acid content are both adjusted to 10–15 percent by weight respectively, the acid mixture of step six contains a 20–40 percent solids concentration and the recrystallizing step proceeds at a temperature between 50° and 80° C., step seven separating the calcium sulphate dihydrate by filtration and recycling the filtrate to step five, step eight washing the resulting calcium sulphate dihydrate with hot water and recycling the washings to step six.

2. The process of claim 1, in which part of the resulting slurry of step three is recycled to step two before filtering the remaind of the slurry.

3. The process of claim 1, in which said sulphuric acid added to step two has a concentration of about 95 to 98.5%.

4. The process of claim 1, in which the reaction period in the step one pre-mixer is 5–10 minutes, and the reaction periods in the first and second digesters is 1 to 2.5 hours.

* * * * *

UNITED STATES PATENT OFFICE
CERTIFICATE OF CORRECTION

Patent No. 3,653,826     Dated April 4, 1972

Inventor(s) TOSHIO ISHIHARA, TAKAYOSHI OKAZAKI and TETSUZO ENDO

It is certified that error appears in the above-identified patent and that said Letters Patent are hereby corrected as shown below:

[22] Filed September 16, 1968

Signed and sealed this 9th day of January 1973.

(SEAL)
Attest:

EDWARD M. FLETCHER, JR.             ROBERT GOTTSCHALK
Attesting Officer                   Commissioner of Patents